Oct. 14, 1947.  C. D. AMMON ET AL  2,429,153
CENTRIFUGAL CLUTCH
Filed April 6, 1944  3 Sheets-Sheet 1
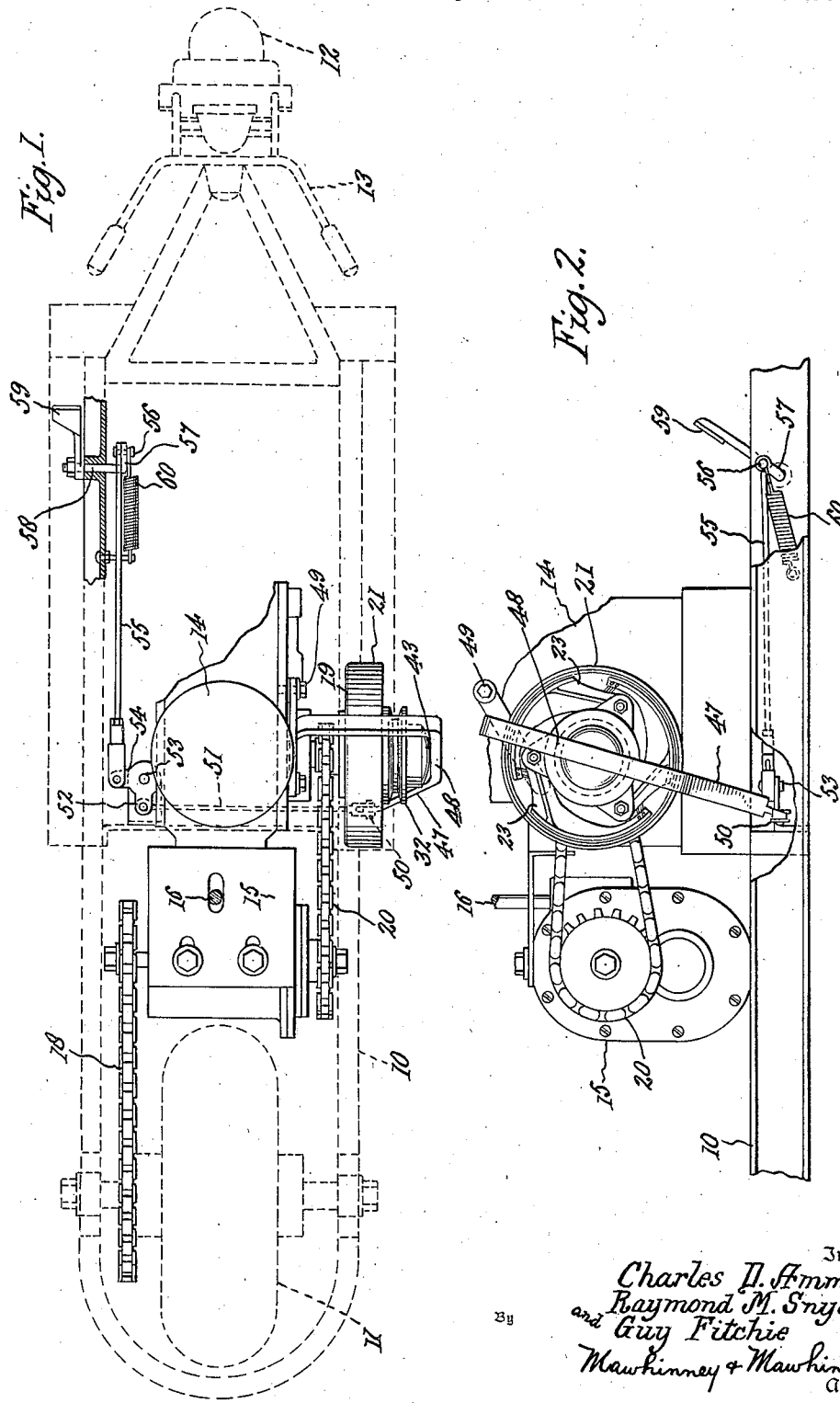
Inventors
Charles D. Ammon
Raymond M. Snyder
and Guy Fitchie
By Mawhinney & Mawhinney
Attorneys Oct. 14, 1947.  C. D. AMMON ET AL  2,429,153
CENTRIFUGAL CLUTCH
Filed April 6, 1944  3 Sheets-Sheet 2

Inventors
Charles D. Ammon
Raymond M. Snyder
and Guy Fitchie
By Mawhinney & Mawhinney
Attorneys Oct. 14, 1947.    C. D. AMMON ET AL    2,429,153
CENTRIFUGAL CLUTCH
Filed April 6, 1944    3 Sheets-Sheet 3
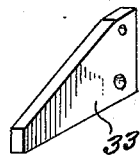
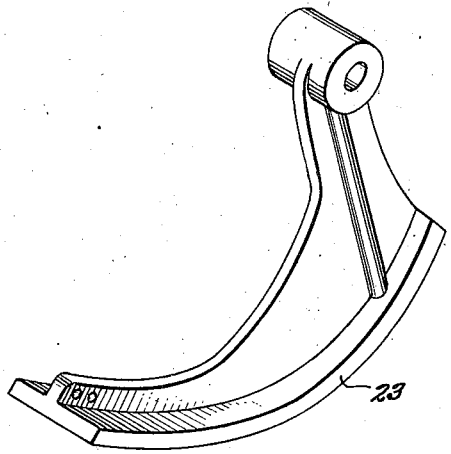
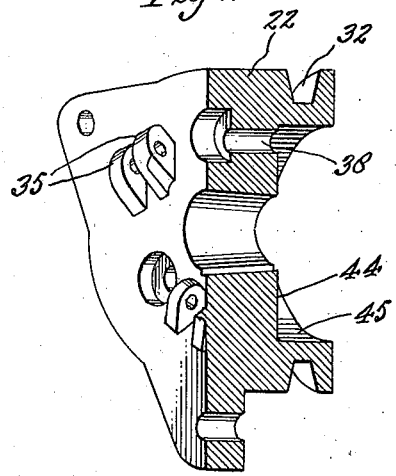
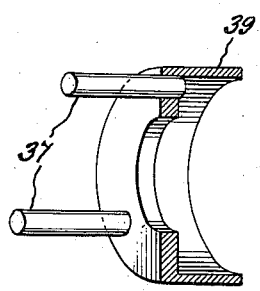
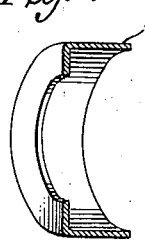
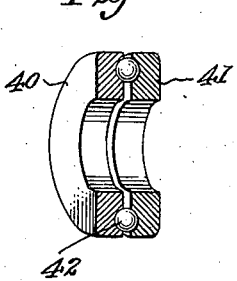
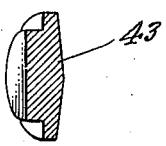
Inventors
Charles D. Ammon
Raymond M. Snyder
Guy Fitchie
By Mawhinney & Mawhinney
Attorneys Patented Oct. 14, 1947

2,429,153

UNITED STATES PATENT OFFICE 2,429,153

CENTRIFUGAL CLUTCH

Charles D. Ammon, Raymond M. Snyder, and Guy Fitchie, Lincoln, Nebr.; said Snyder and said Fitchie assignors to said Ammon Application April 6, 1944, Serial No. 529,807

8 Claims. (Cl. 192—105)

The present invention relates to improvements in centrifugal clutch and while the same may have wider application, the invention has been made to overcome certain problems in a type of vehicle.

In connection with such a vehicle, a centrifugal clutch has been found desirable to permit the vehicle to stand still under perfect control of the operator, and without the operator being required to manually hold the clutch out, and to prevent the operator from stalling the engine by letting in the clutch too quickly.

With a centrifugal clutch it is impossible to stall the engine, because no matter what the load against the engine, the clutch automatically slips when the engine speed is reduced. In this way, a novice can operate the vehicle; whereas, with a manually operated type of clutch, if the operator is inexperienced or gets excited and throws the clutch in too quickly, he may stall the engine or lose control of the machine.

A variable speed transmission has also been used on this type of motor cycle or vehicle for some time. However, it was used in connection with a manually controlled clutch, which lacked the automatic feature. The problem which was introduced with the multiple speed transmission was that there was no known application of an automatic clutch to such, and that therefore the safety feature of the automatic clutch could not be utilized with the variable speed transmission.

It is very advantageous to have the combination of an automatic clutch with a variable speed transmission, because in hilly countries, and where an extremely heavy load is to be carried, it is desirable to operate, and especially to start the machine, in a low gear; whereas, in a level country and with light loads, and with the operation of an automatic clutch, it is very desirable to operate only in high gear. Therefore, this combination is particularly desirable on this type of machine, which is often operated in factory buildings and in small close places where the automatic clutch is very desirable as compared to the straight, manually controlled clutch without the automatic feature.

A further object of the invention is the combination of the manually controlled automatic clutch together with a multiple speed transmission in a vehicle drive.

In addition to these broad objects the invention aims to achieve the described purpose in a combination of newly grouped elements which afford simplicity and inexpensiveness in the construction, simplicity in the mode of operation, freedom from mechanical troubles and easy accessibility for the purpose of making replacement of parts and repairs.

Broadly stated the invention aims to improve existing constructions in three different ways, any one of which may be used independently of the others; first the manual control of the automatic centrifugal clutch; second, the combination of an automatic clutch with a multiple speed transmission; and third, an automatic clutch manually controlled combined with a multiple speed transmission.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of an improved vehicle drive constructed in accordance with the present invention with parts of a vehicle of the type referred to shown in dotted lines.

Figure 2 is a side elevation, with parts broken away, of the engine, transmission and automatic clutch units.

Figure 5 is a perspective view of one form of clutch shoe employed.

Figure 6 is a similar view showing one form of disengagement lever employed.

Figure 7 is a perspective view, with parts broken away, showing a form of driver disc employed.

Figure 8 is a similar view of a portion of the cooperating throw-out bearing.

Figure 9 is also a fragmentary perspective view showing a form of throw-out collar.

Figure 10 is a similar view of the races and ball bearings forming part of the throw-out bearing.

Figure 11 is a similar view of the thrust plate of the throw-out bearing.

Figure 3:
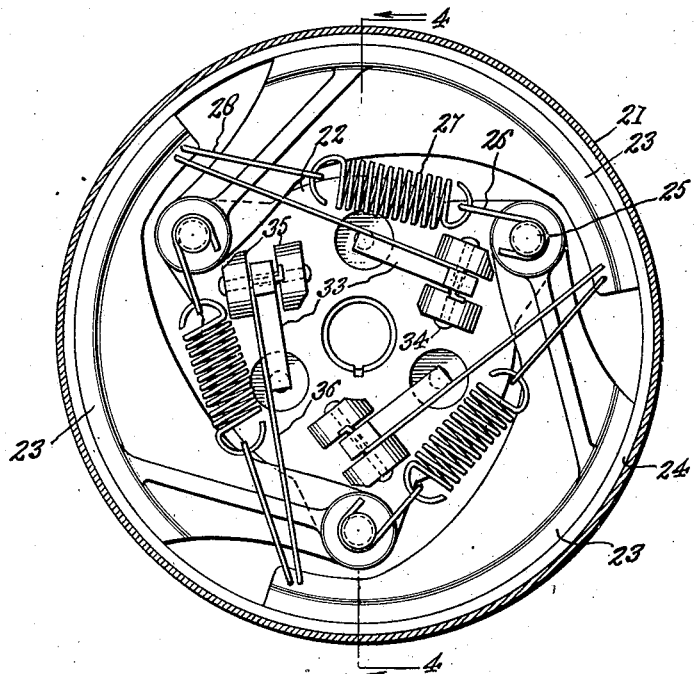
Figure 3 is a side elevation, with parts broken away and parts shown in section, of the automatic clutch taken on an enlarged scale.
Figure 4:
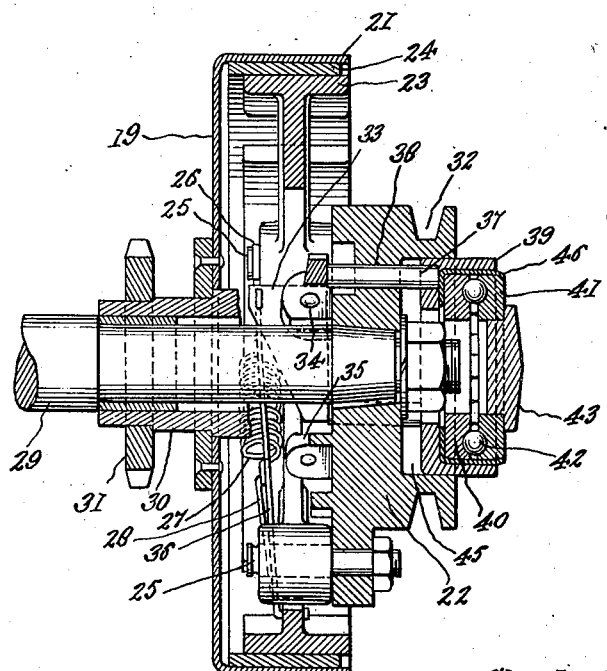
Figure 4 is a vertical transverse section taken through the automatic clutch and associated parts along the line 4—4 in Figure 3.

Referring more particularly to the drawings 10 designates the frame of the vehicle in one form in which it may be manufactured, while 11 represents the rear drive wheel and 12 the front steering wheel, steered by the handle bars 13, a steering wheel or other suitable means.

The vehicle is driven by an internal combustion or other motor or engine 14 through a variable speed transmission 15 having multiple speed ratios. The particular type of transmission herein shown is of the two-speed variety shiftable by the gear shift lever 16 to low and high gear positions. A chain-and-sprocket or other drive connection 18 is made between the variable speed transmission 15 and the rear drive wheel 11.

The motor 14 drives the variable speed transmission 15 through an automatic clutch 19 and through chain-and-sprocket drive connections 20. Although automatic clutches of various constructions and forms may be employed, such as two discs pressed together by the centrifugal force of one end of a bell crank or ball governor transmitted to the movable disc, for convenience in illustration there is included a form of automatic clutch which has proven highly satisfactory and efficient in actual service. This clutch consists of a follower in the form of a drum 21 and a driver in the form of a disc 22, which latter carries one or more pivoted or otherwise movable shoes 23 adapted to be thrown out by centrifugal force to bind upon the drum 21 or upon the drum lining 24 secured to the interior face of the drum. Three such shoes 23 are illustrated in the drawings, such shoes being pivoted on the pivot pins 25 which project outwardly from one face of the driver disc 22. These pivot pins 25 also form convenient means by which to anchor the inner spring ends or inner spring shackles 26 of the coil or other springs 27, the outer ends or shackles 28 of which are coupled to free end portions of the clutch shoes 23. The springs 27 are normally under contractile tension tending to draw the shoes 23 inwardly away from the drum lining 24.

The driver disc 22 is made fast upon the outer end portion of the crank shaft 29 of the motor 14. Such crank shaft 29 is also utilized to serve as a bearing for the driver drum 21 which is affixed to a sleeve 30 loosely rotatable about the crank shaft 29. To this sleeve is also affixed a sprocket 31 forming an element of the chain and sprocket train 20.

The driver disc 22 is conventionally used to carry the pulley groove 32 to receive a belt (not shown) for driving the generator (not shown) of the vehicle.

The automatic clutch is modified to introduce a throw-out feature which is controllable at will by the operator of the vehicle.

Levers 33, one for each clutch shoe 23, are fitted to rock upon pivot pins 34 journalled in pairs of bosses 35 and preferably alongside the springs 27 with the pivot pins adjacent to the ends of such levers. A rod or other connection 36 is coupled between each lever 33 and its respective shoe 23. The rod connections are preferably pivotal connections at each end. The rods 36 at their outer ends may be connected to the shoes 23 by passing the ends of the rods or wires 36 through holes made in the free end portions of the clutch shoes. The inner ends of the rods or wires 36 are connected with the levers 33. The connections made by the rods 36 both with the clutch shoes and with the levers 33 are preferably pivotal connections to maintain the alignment of each rod 36 throughout irrespective of angular changes in the position of the levers 33 about their respective fulcrums 34.

The levers 33 are bellcranks or of L-shape, having long and short legs. The long legs of the levers 33 are disposed in the paths of the pins 37, and the rods 36 are attached to the short legs of the L-shaped levers 33. The pins 37 slide in a direction parallel to the axis of the engine shaft 29 through openings 38 in the driver disc 22. Three such pins 37 are shown in the drawings, one for each of the levers 33.

These pins are fixedly carried by a release collar 39, which may be a short cylinder having one end open to receive the throwout bearing 40. The end or head of such cylinder carries the pins 37.

The thrust bearing 40 may be an ordinary commercial thrust bearing mounted within the release collar 39. The thrust plate 43 is fitted into the thrust bearing.

The necessary actuating pressure on the thrust plate 43 may be applied by any suitable mechanism. In the instance shown a lever 47 of metallic or other material possessing a degree of resiliency is arranged with its intermediate bowed portion 48 crosswise of the thrust plate 43 and in light contact with the outer surface thereof. Such lever is bolted, as indicated at 49, at its upper fulcrum portion to a part of the engine or vehicle frame. The lower portion of this C-shaped lever 47 projects beneath the engine and vehicle frame and is pivotally or flexibly coupled, as indicated at 50, to a transfer rod 51. At its other end the rod 51 is pivoted to one arm 52 of a bell crank lever fulcrumed at 53 on the frame work. The other bell crank arm 54 is pivoted to the longitudinally extending rod 55. The forward end of this rod is pivoted, at 56, to the upstanding arm 57 of a treadle shaft 58 journaled in the framework of the vehicle. Affixed to this treadle shaft 58 is a pedal 59 or other manually operated control member. A spring 60 serves to hold the pedal in an initial position.

The foregoing discloses one method and construction of contracting the shoes in a centrifugal clutch, but we do not wish to be limited to this one method of moving the shoes.

In the operation of the device the engine is started by kick starter or otherwise, and after being allowed to run in an idling range of speed for sufficient time to warm the same to the point of efficiency operation, the vehicle may be put in motion by increasing the motor speed beyond the minimum for which the coil springs 27 have been selected. The spring loaded clutch shoes 23 are at this point thrown out by centrifugal force developed incident to the rotation of the shoes. These shoes being concentric with the drum 21 bind upon the drum lining 24 thereof and cause the drum 21 to be picked up and rotated with the driver disc 22. Through the sprocket and chain drive connections 18, the drum 21 will drive the transmission 15 and in turn the transmission will drive the rear drive wheel 11 through the chain and sprocket drive connections 20. The motor 14 is thus in driving relation to the rear drive vehicle wheel 11. This driving relation is introduced automatically and will continue automatically until such time as the rate of motor speed is allowed to descend below the minimum for which the strength of springs 27 has been selected or the clutch is manually released. During the driving of the vehicle, when occasion requires shifting to a different gear ratio the automatic clutch may be disconnected by depressing the pedal 59 which will cause the rod 55 to be pulled forward, rotating the bell crank and pulling upon the transverse rod 51. This latter rod 51 will pull the bowed portion 48 of the lever 47 against the thrust plate 43. The movement may be only a traverse of a fraction of an inch but it will serve to axially shift the throw-out bearing in the socket 45, having the effect to push the pins 37 inwardly and to rock the levers 33 to such an extent as to draw the friction shoes 23 away from the drum lining 24 in opposition to the centrifugal force. This will disengage the clutch, permitting the vehicle to run free of the engine while the gear shift lever 16 is moved to change gears. When the pressure of the C-shaped lever 47 is exerted on thrust plate 43 which is at that time rotating, the friction between these two parts may slow and even stop the rotation of thrust plate 43 and outer race ring 41 connected thereto. Otherwise the friction between a highly rotating thrust plate 43 and the lever 47 would produce excessive wear between these parts.

The operator de-clutches by pressing upon pedal 59 and immediately thereafter shifts the gear shift lever 16, following which pedal 59 is released so that its spring 60 and the resiliency inherent in the C-shaped lever 47 restore the connections to an initial position. Thus the declutching and gear shifting follows a familiar pattern of sequence in which automobile drivers are already well versed. When the pedal 59 is released the centrifugal force will rock the levers 33 in a reverse movement pushing upon the pins 37 and forcing the throw-out bearing to the outer part of the socket 45. The automatic properties of the clutch are thus restored and the parts are in readiness for the next actuation.

It is obvious that various changes and modifications may be made in the details of construction and design of the above specifically described embodiment of this invention without departing from the spirit thereof, such changes and modifications being restricted only by the scope of the following claims.

What is claimed is:

1. In a vehicle in which an engine drives one or more rear wheels, the engine having a driven shaft extending exteriorly of the engine casing and being without bearing support at its outer end, the combination comprising a follower of an automatic clutch loosely journaled on said shaft, a transmission element affixed to rotate with the follower and having connection to the vehicle drive wheel, a driver affixed upon said shaft outwardly of the follower, clutch connecting means between the driver and the follower biased to declutching position and movable to clutching position under the influence of centrifugal force, and means to cause manual selective declutching of said clutch engaging means against the influence of the centrifugal force comprising a thrust bearing movable in said driver axially of the shaft, declutching members carried by said shiftable thrust bearing, and a normally rotatable thrust plate carried by said bearing axially of the shaft, and an actuating member movable against said plate in axial alignment with the shaft.

2. In a vehicle in which an engine drives a ground wheel, and in which the engine has a driven shaft projecting beyond the engine casing with an unsupported free projecting end, the combination comprising driver and follower members of an automatic clutch mounted fixedly and loosely respectively on said shaft, clutch engaging means between said members biased to declutching position and movable by centrifugal force to clutching engagement, and means for declutching said clutch engaging means against the influence of the centrifugal force comprising a thrust bearing movable in the drive member axially of the shaft and having inner and outer parts normally rotating with said driver, bearings between the parts, a thrust plate carried by the outer part, declutching elements carried with the inner part and movable rectilinearly back and forth through the driver substantially parallel to the axis of the shaft, and means for manually and selectively exerting pressure inwardly toward the engine upon said thrust plate.

3. In a vehicle in which an engine drives a ground wheel, and in which the engine has a driven shaft projecting beyond the engine casing with an unsupported free projecting end, the combination comprising driver and follower members of an automatic clutch mounted fixedly and loosely respectively on said shaft, clutch engaging means between said members biased to declutching position and movable by centrifugal force to clutching engagement, and means for declutching said clutch engaging means against the influence of the centrifugal force comprising a thrust bearing having inner and outer parts and bearings therebetween, pins carried by the inner part of the bearing and movable through the driver, means moved by said pins for declutching the clutch engaging means, and means for selectively pressing upon the outer member of the bearing to slow its rotation and shift the bearing and said pins inwardly.

4. In a vehicle in which an engine drives a ground wheel, and in which the engine has a driven shaft projecting beyond the engine casing with an unsupported free projecting end, the combination comprising driver and follower members of an automatic clutch mounted fixedly and loosely respectively on said shaft, clutch engaging means between said members biased to declutching position and movable by centrifugal force to clutching engagement, and means for declutching said clutch engaging means against the influence of the centrifugal force comprising movable declutching means carried by said driver and shiftable back and forth axially of the shaft, a thrust plate on said movable declutching means outwardly of the end of said shaft, and a lever fulcrumed crosswise of said plate and positioned to engage the same and to press upon the plate inwardly toward said shaft.

5. In a vehicle having an engine for driving a road wheel of the vehicle in which the engine has a driven shaft extending outwardly therefrom, an automatic clutch comprising a drum freely journaled on said shaft, a drive disc fast to the end portion of the shaft, radially movable clutch shoes carried by said disc and positioned to engage said drum, means to yieldably hold the shoes retracted away from said drum, and means for retracting the shoes against centrifugal force having a value superior to said yieldable means comprising levers fulcrumed to said drive disc, connections between said levers and the free end portions of said clutch shoes, and means for rocking said levers to pull upon said connections.

6. In a vehicle having an engine for driving a road wheel of the vehicle in which the engine has a driven shaft extending outwardly therefrom, an automatic clutch comprising a drum freely journaled on said shaft, a drive disc fast to the end portion of the shaft, radially movable clutch shoes carried by said disc and positioned to engage said drum, means to yieldably hold the shoes retracted away from said drum, and means for retracting the shoes against centrifugal force having a value superior to said yieldable means comprising bell crank levers pivoted to said driver and having long and short arms, rod connections between the short arms of said levers and the free end portions of said clutch shoes, and means positioned to engage the long arms of said levers and rock the levers to pull upon said rod connections.

7. In a vehicle having an engine for driving a road wheel of the vehicle in which the engine has a driven shaft extending outwardly therefrom, an automatic clutch comprising a drum freely journaled on said shaft, a drive disc fast to the end portion of the shaft, radially movable clutch shoes carried by said disc and positioned to engage said drum, means to yieldably hold the shoes retracted away from said drum, and means for retracting the shoes against centrifugal force having a value superior to said yieldable means comprising levers fulcrumed upon said driver, rod connections between the far ends of said levers and the free ends of said shoes, said rod connections and said levers extending in a substantially straight line which is substantially a chord of the circle of the clutch, and means movable at substantially right angles to the direction of pull of said rod connections for causing rocking movement of the levers.

8. In a vehicle having an engine for driving a road wheel of the vehicle in which the engine has a driven shaft extending outwardly therefrom, an automatic clutch comprising a drum freely journaled on said shaft, a drive disc fast to the end portion of the shaft, radially movable clutch shoes carried by said disc and positioned to engage said drum, means to yieldably hold the shoes retracted away from said drum, and means for retracting the shoes against centrifugal force having a value superior to said yieldable means comprising coupled rods and levers affixed respectively to the free ends of the brake shoes and to said driver.

CHARLES D. AMMON.
RAYMOND M. SNYDER.
GUY FITCHIE.

REFERENCES CITED

The following references are of record in the file of this patent:

UNITED STATES PATENTS

| Number | Name | Date |
|---|---|---|
| 671,306 | Blakeslee | Apr. 2, 1901 |
| 675,425 | Sturtevant | June 4, 1901 |
| 701,953 | Smith | June 10, 1902 |
| 745,559 | Beard | Dec. 1, 1903 |
| 1,478,294 | Patterson | Dec. 18, 1923 |
| 1,659,286 | Wallace | Feb. 14, 1928 |
| 1,714,748 | Wright | May 28, 1929 |
| 1,878,824 | Dodge | Sept. 20, 1932 |
| 1,910,352 | Moyer | May 23, 1933 |
| 1,983,661 | Frantz et al. | Dec. 11, 1934 |
| 2,048,435 | Dodge | July 21, 1936 |
| 2,051,375 | Harrison | Aug. 18, 1936 |
| 2,087,968 | Dodge | July 27, 1937 |
| 2,230,293 | Harris | Feb. 4, 1941 |
| 2,286,461 | Burns | June 16, 1942 |
| 2,355,709 | Dodge | May 28, 1929 |

FOREIGN PATENTS

| Number | Country | Date |
|---|---|---|
| 352,454 | France | June 2, 1905 |
| 396,582 | France | Jan. 29, 1929 |